United States Patent [19]

Diehl et al.

[11] 4,072,593

[45] Feb. 7, 1978

[54] PROCESS FOR PRODUCTION OF A RESISTANCE ELEMENT FOR RESISTANCE THERMOMETERS

[75] Inventors: Walter Diehl, Hanau; Wolfgang Koehler, Alzenau-Horstein, both of Germany

[73] Assignee: Deutsche Gold- und Silber-Scheideanstalt vormals Roessler, Frankfurt, Germany

[21] Appl. No.: 751,217

[22] Filed: Dec. 16, 1976

[30] Foreign Application Priority Data

Dec. 24, 1975 Germany .............................. 2558752

[51] Int. Cl.$^2$ ............................................. C23C 15/00
[52] U.S. Cl. ................................. 204/192 F; 338/308
[58] Field of Search ......... 204/192 C, 192 SP, 192 F; 338/308

[56] References Cited

U.S. PATENT DOCUMENTS

| 3,645,783 | 2/1972 | Rupert et al. .................... 338/308 X |
| 3,833,410 | 9/1974 | Ang ............................. 204/192 F X |
| 3,845,443 | 10/1974 | Fisher ................................... 338/25 |

OTHER PUBLICATIONS

W. D. Westwood et al. "Formation of PtO Films by Reactive Sputtering," *J. Appl. Phys.* 45, pp. 2313–2315 (1974).

C. D. Bennewitz et al. "Structural & Electrical Properties of Films Sputtered from a Pt Cathode in Argon–Oxygen Mixtures," *J. Appl. Phys.*, 46, pp. 558–567 (1975).

*Primary Examiner*—Aaron Weisstuch
*Attorney, Agent, or Firm*—Cushman, Darby & Cushman

[57] ABSTRACT

There is provided a process of producing a resistance element for a resistance thermometer consisting of a thin platinum layer on an insulating solid as a carrier, by sputtering the platinum layer on the solid in a krypton-oxygen or xenon-oxygen mixture.

10 Claims, No Drawings

PROCESS FOR PRODUCTION OF A RESISTANCE ELEMENT FOR RESISTANCE THERMOMETERS

The invention is directed to a process for the production of a resistance element for a resistance thermometer consisting of an insulating solid as carrier and a thin platinum layer, preferably in serpentine shape, as resistance material by sputtering the platinum onto the solid.

In the customary resistance elements for resistance thermometers thin wires or ribbons of metals such as nickel or platinum which have a fixed resistance value and a high temperature coefficient (TCR) of electrical resistance are applied to electrically nonconducting carriers or are embedded therein.

If higher requirements in regard to exactitude and stability at higher temperatures are placed on such a resistance element, platinum is generally used as the resistance material. The resistance value at 0° C ($R_o$) and the temperature coefficient of the electrical resistance between 0° and 100° C. (TCR) of a platinum resistance element is standard in all important industrial countries, in Germany for example through DIN 43760. In this standard the following values are defined: $R_o$ = (100 ± 0.1) ohm and TCR = (3.85 ± 0.012) · $10^{-3}$ · °$C^{-1}$. In the corresponding standards of other countries similar values are obtained.

These standards are fulfilled by the customary resistances elements today, but the use of resistance thermometers equipped with platinum wires is limited in practice since they show various disadvantages for special cases. Thus, for example, such resistance elements have relatively long response times and cannot be produced below a certain size, since a fixed wire length is necessary for keeping the $R_o$ value.

Therefore, in the past there have been numerous attempts to use platinum wires as thin as possible, but with such thin wires one is faced with technical difficulties in regard to the further workability and production costs of the measuring resistance.

Therefore, it has already been proposed to use resistance elements for resistance thermometers in which a thin platinum layer is applied to an electrical nonconducting carrier. Thus, for example, it is known from Ruthardt German Pat. No. 828,930 to place thin platinum layers on electrically nonconducting carrier such as glass or ceramic by high vacuum vaporization or cathode sputtering by which the layer can cover the entire surface or only selected regions of the carrier substrate. From Fisher German Offenlegungsschrift No. 2,327,662 and related Fisher U.S. Pat. No. 3,845,443 it is further known to apply a high aluminum oxide containing glass having a thin film of platinum embedded therein to a ceramic carrier. The entire disclosure of the Fischer U.S. Patent is hereby incorporated by reference and relied upon.

All of these known resistance elements with thin platinum films have the disadvantage that they do not reach the temperature coefficient of 3.85 × $10^{-3}$/° C prescribed by the German Industrial Standard (DIN) and by other standards. Such resistance elements, therefore, until now have found scarcely any use in practice.

Therefore, it has already been proposed to use resistance elements consisting of an insulating substrate as a carrier and a thin platinum layer as resistance material in which there must be used as the carrier for the platinum layer a material which has a greater coefficient of thermal expansion than platinum between 0° and 1000° C. These resistance elements, however, have the specific disadvantage that one is limited in the choice of material which can be selected for the carrier.

It is the object of the present invention to produce resistance elements for resistance thermometers which have a relatively short response time, are producible in small sizes without special expenditure and above all have a TCR between 0° to 100° C. of at least 3.85 × $10^{-3}$ × °$C^{-1}$ without being subject to great limitations in selection of the carrier material.

This problem was solved by sputtering a thin platinum layer as resistance material on an insulating substrate as a carrier material wherein according to the invention the platinum layer is sputtered on in a gaseous mixture of krypton and oxygen or xenon and oxygen. The gaseous mixture can contain 10 to 50 volume % oxygen and the balance xenon, krypton or a mixture of xenon and krypton.

It is especially advantageous to subsequently temper the platinum layer in an oxidizing atmosphere above 700° C. Furthermore, it is advantageous to apply a counter-voltage on the substrate during the sputtering process.

In order to produce a sufficiently high resistance value the platinum layer must maintain a meander or serpentine shaped conductor path. This can be accomplished with sufficiently thin platinum layers by photo-etching processes known from microelectronics. The platinum film is coated with a photosensitive varnish and the desired structure produced in this by making, exposure to light and development. Then the desired conductor paths are produced in the platinum layer by ion etching or another process.

It is known that metal layers sputtered in argon do not reach the temperature coefficients of the corresponding solid metal; also, if the layer thickness is sufficiently great the contribution of the scattering of electrons on the layer surface to the temperature coefficient is negligibly small. Also in the sputtering of a platinum layer on a ceramic support in argon or argon-oxygen mixtures adhesion of the layer to the ceramic support sufficient for industrial use is not produced.

Therefore, it was surprising that with platinum layers which are sputtered on in a xenon-oxygen mixture or in a krypton-oxygen mixture the temperature coefficient of 3.85 × $10^{-3}$ × ° C required by the standards is reproducibly reached and there is produced an outstanding adhesion to the support. The layers are advantageously tempered at a temperature between 700° and 1200° C., preferably at 1000° C. after the sputtering.

After the tempering the platinum layer is provided with serpentine shaped conductor paths by use of a laser beam or with the help of photo-etching processes known from microelectronics and the resistance made equal to the standard value with a laser beam.

The resistance elements produced according to the invention are present first as platelets; they are subsequently provided with lead-in-wires and can then be protected by an insulating layer, be employed as flat measuring resistances or be cemented in ceramic tubes or can be melted in. In this manner there are produced platinum resistors with previously unreachable small dimensions and with lower costs.

The following example further illustrates the invention.

EXAMPLE

There was applied to an aluminum oxide/thin film substrate (dimensions 100 mm × 100 mm × 0.6 mm) a platinum layer having a thickness of 1.6 μm by sputtering in a commercial RF sputtering apparatus at a working pressure of $6 \times 10^{-3}$ Torr in a xenon-oxygen mixture-containing 20% by volume of oxygen. The target voltage was 3900 V, the applied counter-voltage (bias) on the substrate 150 volts. The platinum layer was subsequently tempered for 3 hours at 1000° C. Meanders were produced by means of a laser beam and standardized to $R_o = 100 \Omega$. The substrate was broken into strips by scratches and fractures with the same meander patterns. The $R_o$ values of these resistors are in the region $100 \pm 0.1 \Omega$, the temperature coefficient of the electrical resistance is $3.860 \times 10^{-3} \times °C^{-1}$. The absolute pressure in the sputtering operation can be that which is conventional in the art, e.g., 0.1 to 100 microns as in the Fisher German OS and Fisher U.S. Pat. No. 3,845,443.

The resistance elements can consist essentially of or consist of the composition set forth and the sputtering gas consist essentially of or consist of said oxygen and xenon or krypton.

What is claimed is:

1. A process of producing a resistance element for a resistance thermometer by sputtering, said resistance element consisting essentially of a thin platinum layer as the resistance material on an insulating material as a substrate, the improvement comprising applying the platinum to the substrate by sputtering in a gaseous oxidizing atmosphere consisting essentially of krypton-oxygen or xenon-oxygen.

2. A process according to claim 1 comprising the additional step of tempering the thin platinum layer at a temperature between 700° and 1200° C. after the sputtering.

3. The process according to claim 2 wherein a bias voltage less than the sputtering voltage is applied to the substrate during the sputtering.

4. The process according to claim 1, wherein a bias voltage less than the sputtering voltage is applied to the substrate during the sputtering.

5. The process of claim 1 wherein the gaseous atmosphere contains 20% oxygen and the balance xenon.

6. The process of claim 1 wherein the gaseous atmosphere is 10 to 50% oxygen by volume and the balance is krypton or xenon.

7. The process of claim 6 wherein the gaseous atmosphere is 10 to 50% oxygen by volume and the balance is xenon.

8. The process of claim 7 wherein the sputtering is RF sputtering.

9. The process of claim 6 wherein the sputtering is RF sputtering.

10. The process of claim 1 wherein the sputtering is RF sputtering.

* * * * *